United States Patent
Tiana et al.

(10) Patent No.: US 10,325,560 B1
(45) Date of Patent: Jun. 18, 2019

(54) HEAD WEARABLE DISPLAY DEVICE

(71) Applicant: Rockwell Collins, Inc., Cedar Rapids, IA (US)

(72) Inventors: Carlo L. Tiana, Portland, OR (US); Eric P. Stratton, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 74 days.

(21) Appl. No.: 15/816,186

(22) Filed: Nov. 17, 2017

(51) Int. Cl.
G09G 3/32 (2016.01)
G09G 3/34 (2006.01)
G02B 27/01 (2006.01)

(52) U.S. Cl.
CPC ....... G09G 3/3426 (2013.01); G02B 27/0172 (2013.01); G09G 3/32 (2013.01); G02B 2027/014 (2013.01); G02B 2027/0125 (2013.01); G09G 2320/0626 (2013.01)

(58) Field of Classification Search
USPC ............................................. 345/212, 690
See application file for complete search history.

(56) References Cited

U.S. PATENT DOCUMENTS

| 9,715,067 B1 | 7/2017 | Brown et al. | |
| 2011/0013245 A1* | 1/2011 | Tanaka | G02B 26/105 |
| | | | 359/201.2 |
| 2011/0128364 A1* | 6/2011 | Ono | G02B 27/017 |
| | | | 348/78 |
| 2011/0227907 A1* | 9/2011 | Sato | G02B 27/017 |
| | | | 345/212 |
| 2011/0316763 A1* | 12/2011 | Yada | G02B 27/017 |
| | | | 345/8 |
| 2013/0128611 A1* | 5/2013 | Akutsu | G02B 5/09 |
| | | | 362/607 |
| 2014/0104665 A1* | 4/2014 | Popovich | G02B 27/0176 |
| | | | 359/15 |
| 2015/0289762 A1* | 10/2015 | Popovich | G02B 27/0093 |
| | | | 351/209 |
| 2016/0209657 A1* | 7/2016 | Popovich | G02B 27/017 |
| 2017/0176752 A1* | 6/2017 | Vieira | G02B 27/0075 |
| 2018/0232048 A1* | 8/2018 | Popovich | A61B 3/113 |

* cited by examiner

*Primary Examiner* — Tony O Davis
(74) *Attorney, Agent, or Firm* — Angel N. Gerdzhikov; Donna P. Suchy; Daniel M. Barbieri

(57) ABSTRACT

A head wearable display device, a method, and a system. The head wearable display device may include a visor portion implemented as a pupil-expanding waveguide, a processor, an image illumination source communicatively coupled to the processor and configured to output optical signals, an optical pathway, and column injectors implemented in and along the optical pathway. Each of the column injectors may be associated with a pixel column. Each of the column injectors may be configured to be in a pass-through state or a deflect state. When a given column injector is in the pass-through state, the given column injector may allow optical signals to pass through the given column injector. When a particular column injector is in the deflect state, the particular column injector may be configured to deflect the optical signals into the visor portion causing a column of pixels to display in the visor portion.

19 Claims, 14 Drawing Sheets

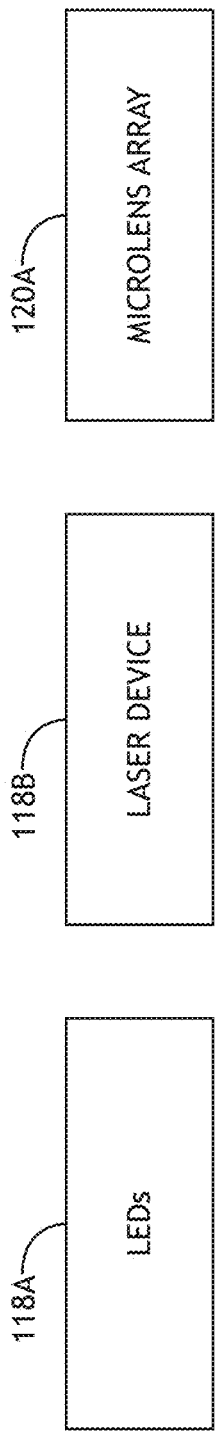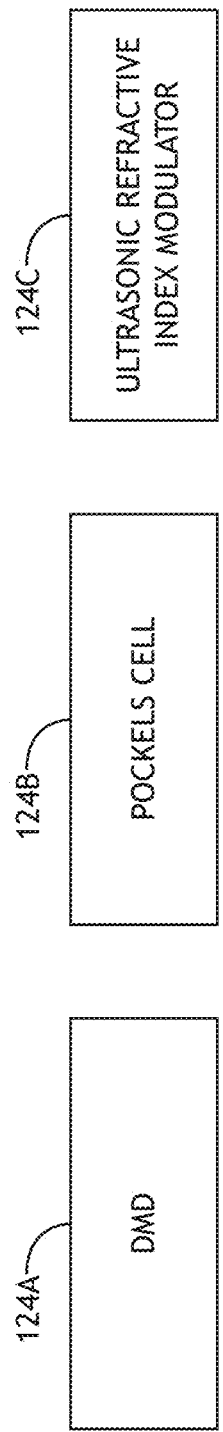

HEAD WEARABLE DISPLAY DEVICE

BACKGROUND

Head worn displays are increasingly finding cockpit applications. Typical head worn displays obscure the peripheral and brow area visual field of view of a wearer.

SUMMARY

In one aspect, embodiments of the inventive concepts disclosed herein are directed to a head wearable display device. The head wearable display device may include a visor portion implemented as a pupil-expanding waveguide, a processor, an image illumination source communicatively coupled to the processor, an optical pathway, and column injectors implemented in and along the optical pathway. The processor may be configured to receive image data and output collimated image illumination data. The image illumination source may be configured to receive the collimated image illumination data and output optical signals based on the collimated image illumination data. The optical pathway may be configured to receive the optical signals, wherein the optical signals pass through the optical pathway. Each of the column injectors may be associated with a pixel column. Each of the column injectors may be configured to be in a pass-through state or a deflect state. When a given column injector is in the pass-through state, the given column injector allows the optical signals to pass through the given column injector. When a particular column injector is in the deflect state, the particular column injector is configured to deflect the optical signals into the visor portion causing a column of pixels to display in the visor portion.

In a further aspect, embodiments of the inventive concepts disclosed herein are directed to a system. The system may include a computing device and a head wearable display device. The computing device may include a processor and memory and may be configured to output image data. The head wearable display device may include a visor portion implemented as a pupil-expanding waveguide, a processor, an image illumination source communicatively coupled to the processor, an optical pathway, and column injectors implemented in and along the optical pathway. The processor may be configured to receive the image data and output collimated image illumination data. The image illumination source may be configured to receive the collimated image illumination data and output optical signals based on the collimated image illumination data. The optical pathway may be configured to receive the optical signals, wherein the optical signals pass through the optical pathway. Each of the column injectors may be associated with a pixel column. Each of the column injectors may be configured to be in a pass-through state or a deflect state. When a given column injector is in the pass-through state, the given column injector allows the optical signals to pass through the given column injector. When a particular column injector is in the deflect state, the particular column injector is configured to deflect the optical signals into the visor portion causing a column of pixels to display in the visor portion.

In a further aspect, embodiments of the inventive concepts disclosed herein are directed to a method for operating a head wearable display device. The head wearable display device may include a visor portion implemented as a pupil-expanding waveguide, a processor, an image illumination source communicatively coupled to the processor, an optical pathway, and column injectors implemented in and along the optical pathway. Each of the column injectors may be associated with a pixel column. Each of the column injectors may be configured to be in a pass-through state or a deflect state. When a given column injector is in the pass-through state, the given column injector allows the optical signals to pass through the given column injector. When a particular column injector is in the deflect state, the particular column injector is configured to deflect the optical signals into the visor portion causing a column of pixels to display in the visor portion. The method may include receiving, by the processor, image data. The method may include outputting, by the processor, collimated image illumination data. The method may include receiving, by the image illumination source, the collimated image illumination data. The method may include outputting, by the image illumination source, optical signals based on the collimated image illumination data. The method may include receiving, by the optical pathway, the optical signals, wherein the optical signals pass through the optical pathway. The method may include deflecting, by the particular column injector in the deflect state, the optical signals into the at least one visor portion causing the column of pixels to display in the at least one visor portion.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 2 is a view of the image illumination source of the head wearable display device of FIG. 1 implemented as or including light emitting diodes (LEDs) according to the inventive concepts disclosed herein.

FIG. 3 is a view of the image illumination source of the head wearable display device of FIG. 1 implemented as or including a laser device according to the inventive concepts disclosed herein.

FIG. 4 is a view of the collimating optics of the head wearable display device of FIG. 1 implemented as or including a microlens array according to the inventive concepts disclosed herein.

FIG. 5 is a view of a column injector of the head wearable display device of FIG. 1 implemented as or including a digital mirror device (DMD) according to the inventive concepts disclosed herein.

FIG. 6 is a view of a column injector of the head wearable display device of FIG. 1 implemented as or including a Pockels cell according to the inventive concepts disclosed herein.

FIG. 7 is a view of a column injector of the head wearable display device of FIG. 1 implemented as or including an ultrasonic refractive index modulator according to the inventive concepts disclosed herein.

DETAILED DESCRIPTION

Figure 1:
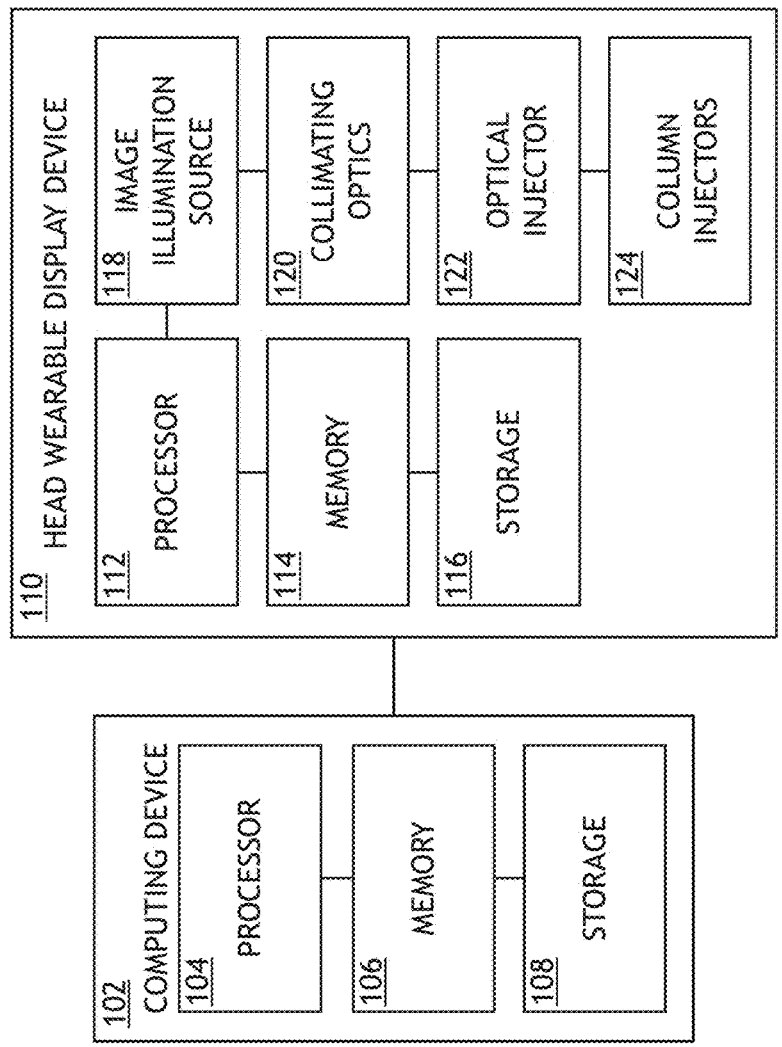
FIG. 1 is a view of an exemplary embodiment of a system including a head wearable display device and a computing device according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a head wearable display device, a system, and a method. The head wearable display device may include an at least partially transparent (e.g., transparent or tinted) visor configured to display images to a user while the user is able to see a field of view (e.g., a wide field of view) through the visor. Some embodiments provide an improvement over currently implemented head worn display devices by displaying images on a visor without obscuring the peripheral and brow area visual field of view of a wearer.

Referring now to FIGS. 1-7, an exemplary embodiment of a system according to the inventive concepts disclosed herein includes a computing device 102 and a head wearable display device 110, which may be communicatively coupled at any given time.

The computing device 102 may include at least one processor 104, at least one memory 106, and at least one storage device 108, as well as other components, equipment, and/or devices commonly included in a computing device, some or all of which may be communicatively coupled. The processor 104 may be implemented as any suitable processor, such as a general purpose processor, an FPGA, and/or an image processor. For example, the computing device 102 may be configured to generate image data and output image data to the head wearable display device 110. In some embodiments, the image data is virtual image data corresponding to a field of view of a wearer of the head wearable display device 110. The processor 104 may be configured to run various software applications or computer code stored (e.g., maintained) in a non-transitory computer-readable medium (e.g., memory 106 and/or storage 108) and configured to execute various instructions or operations. The computing device 102 may be implemented as any suitable computing device. In some embodiments, the computing device 102 is implemented as a vetronics computing device (e.g., an avionics computing device) in a vehicle, such as an aircraft or automobile. For example, the computing device 102 may be implemented as a flight management system (FMS) computing device configured to output graphical data associated with an FMS. Additionally, for example, the computing device 102 or the processor 104 may be implemented as special purpose computers or special purpose processors configured (e.g., programmed) to execute instructions for performing any or all of the operations disclosed throughout. In some embodiments, the system of FIG. 1 may include any suitable number of computing devices 102.

While the computing device 102 exemplarily includes elements as shown, in some embodiments, one or more of the elements of the computing device 102 may be omitted, or the computing device 102 may include other elements.

Figure 11:
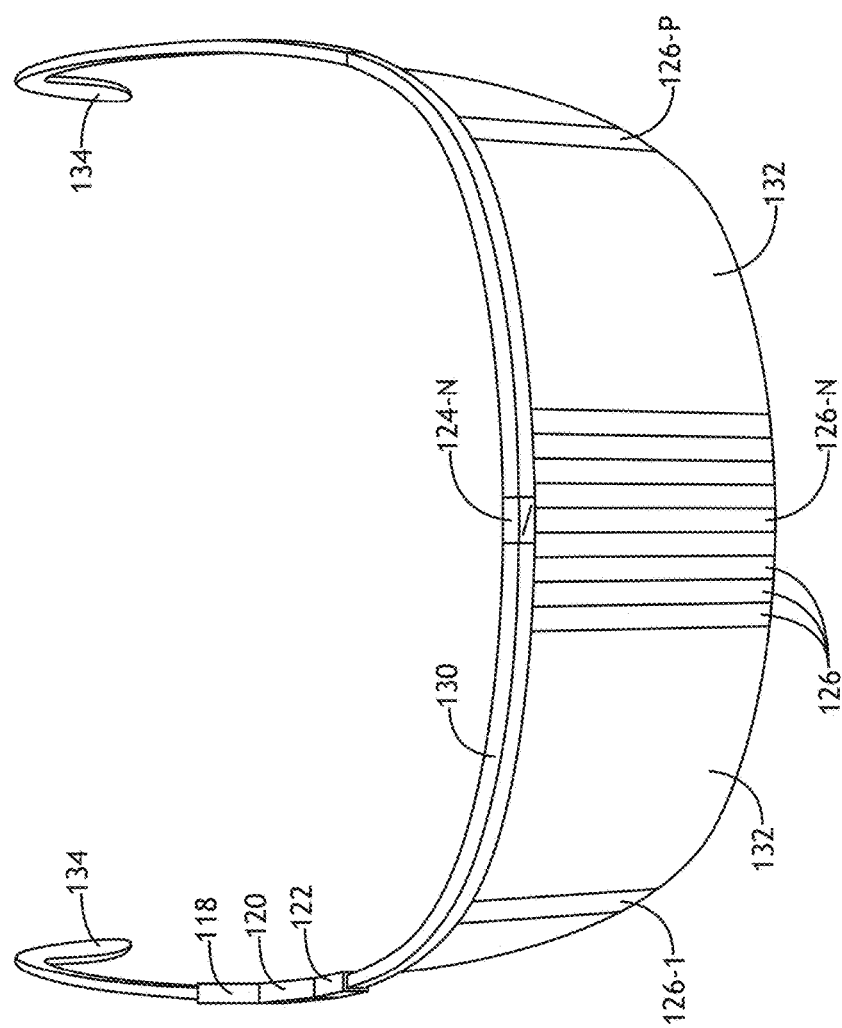
FIG. 11 is a view of the head wearable display device of FIG. 1 according to the inventive concepts disclosed herein.

The head wearable display device 110 may be configured to display images on an at least partially transparent visor (e.g., 132, as shown in FIG. 11) while the user is able to see a field of view through the visor. The head wearable display device 110 may include at least one processor 112, at least one memory 114, at least one storage device 116, an image illumination source 118, collimating optics 120, an optical injector 122, and column injectors 124, some or all of which may be communicatively coupled and/or optically coupled at any given time. Additionally, the head wearable display device 110 may include an optical pathway (e.g., 130, as shown in FIG. 11) and temple bars (e.g., 134, as shown in FIG. 11).

The processor 112 may be implemented as any suitable processor, such as a general purpose processor, an FPGA, and/or an image processor. For example, the processor 112 may be configured to receive image data from the computing device 102, collimate the image data, generate collimated image illumination data, and output collimated image illumination data to the image illumination source 118. The image data may correspond to an image to be displayed on the visor. The collimated image data may be a column of pixels of the image. The collimated image illumination data may be data configured to cause the image illumination source 118 to output optical signals that result in a column of pixels of the image being displayed on the visor. The processor 112 may be configured to cause each of the plurality of column injectors 124 to be in a pass-through state or a deflect state. Additionally, the processor 112 may be configured to control a state (e.g., a pass-through state or a deflect state) of each of the column injectors 124 synchronously with the outputted collimated image illumination data.

For example, at a given time, the processor 112 may be configured to cause a first column injector of the column injectors 124 to be in a deflect state while causing intervening column injectors positioned between the first column injector and the collimating optics 120 to be in pass through states such that collimated optical signals pass through the intervening column injectors in the pass through states to the first column injector in the deflect state and such that the collimated optical signals are deflected into the visor by the first column injector. Additionally, for example, at a second given time, the processor 112 may be configured to cause a second column injector of the column injectors 124 to be in a deflect state while causing second intervening column injectors positioned between the second column injector and the collimating optics 120 to be in pass through states such that the collimated optical signals pass through the second intervening column injectors in the pass through states to the second column injector in the deflect state and such that the collimated optical signals are deflected into the visor by the second column injector. Likewise, the processor 112 may be configured to iteratively perform such repeated operations of controlling the column injectors 124 synchronously with outputted collimated image illumination data so as to result in sequentially displayed columns of pixels being displayed in the visor so quickly that the wearer of the head wearable display device 110 perceives an image rather than just a single column of pixels at a time. That is, the processor 112 may be configured to iteratively cause different columns of pixels to display in the at least one visor portion such that a human wearing the head wearable display device 110 perceives a displayed image.

Additionally, the processor 112 may be configured to run various software applications or computer code stored (e.g., maintained) in a non-transitory computer-readable medium (e.g., memory 114 and/or storage 116) and configured to execute various instructions or operations. Additionally, for example, the processor 112 may be implemented as a special purpose processor configured (e.g., programmed) to execute instructions for performing any or all of the operations disclosed throughout. In some embodiments, the system of FIG. 1 may include any suitable number of processor 112.

The image illumination source 118 may be configured to receive collimated image illumination data from the processor 112, generate optical signals based on the collimated image illumination data, and output the optical signals to the collimating optics 120. The optical signals may correspond to a column of pixels of the image. In some embodiments, the image illumination source 118 may include or be implemented as a row or column of light emitting diodes (LEDs) 118A, as shown in FIG. 2, such as organic LEDs (OLEDs) or micro-LED emitters. Additionally, for example, the image illumination source 118 may include or be implemented as at least one laser device 118B (e.g., a laser or a laser-diode device), as shown in FIG. 3, configured to optically scan onto a phosphorescent layer so as to create the optical signals. Additionally, for each column of pixels of the image, the image illumination source 118 may be configured to receive collimated image illumination data from the processor 112, generate optical signals based on the collimated image illumination data, and output the optical signals to the collimating optics 120 iteratively and successively so as to result in sequentially displayed columns of pixels being displayed in the visor so quickly that the wearer of the head wearable display device 110 perceives an image rather than just a single column of pixels at a time. In some embodiments, the image illumination source 118 may include collimating optics such that the image illumination source 118 outputs collimated optical signals.

The collimating optics 120 may be configured to receive the optical signals from the image illumination source 118, collimate the optical signals, and output collimated optical signals to the optical injector 122 and/or the optical pathway (e.g., 130). In some embodiments, the collimating optics 120 may include or be implemented as a microlens array 120A, as shown in FIG. 4. While the collimating optics 120 is shown and described as a distinct element in FIG. 1 (and also FIG. 11), in some embodiments the collimating optics may be implemented as part of the image illumination source 118, the optical injector 122, or the column injectors 124.

The optical injector 122 may may be configured to receive the collimated optical signals from the collimating optics 120 and transition the collimated optical signals from the collimating optics 120 to the optical pathway (e.g., 130, as shown in FIG. 11). In some embodiments, the optical injector 122 forms a part of the optical pathway (e.g., 130). In some embodiments, the optical injector 122 may include collimating optics such that the optical injector 122 collimates the optical signals from the image illumination source 118 as they pass through the optical injector 122.

The column injectors 124 may be implemented in and along the optical pathway (e.g., 130). Each of the column injectors 124 is associated with a pixel column configured to display a column of pixels of the image. Each of the column injectors 124 may be configured to be in a pass-through state or a deflect state. When a given column injector is in the pass-through state the given column injector allows the collimated optical signals to pass through a given column injector. When a particular column injector is in the deflect state the particular column injector is configured to deflect the collimated optical signals into the at least one visor portion causing a column of pixels to display in the at least one visor portion. In some embodiments, only one of the column injectors 124 is in a deflect state at a time while the other of the column injectors 124 are in pass-through states.

For example, at a given time, the processor 112 may be configured to cause a first column injector of the column injectors 124 to be in a deflect state while causing intervening column injectors positioned between the first column injector and the collimating optics 120 to be in pass through states such that the collimated optical signals pass through the intervening column injectors in the pass through states to the first column injector in the deflect state and such that the collimated optical signals are deflected into the visor (e.g., 132) by the first column injector. Additionally, for example, at a second given time, the processor 112 may be configured to cause a second column injector of the column injectors 124 to be in a deflect state while causing second intervening column injectors positioned between the second column injector and the collimating optics 120 to be in pass through states such that the collimated optical signals pass through the second intervening column injectors in the pass through states to the second column injector in the deflect state and such that the collimated optical signals are deflected into the visor (e.g., 132) by the second column injector. Likewise, the processor 112 may be configured to iteratively perform such repeated operations of controlling the column injectors 124 synchronously with outputted collimated image illumination data so as to result in sequentially displayed columns of pixels being displayed in the visor so quickly that the wearer of the head wearable display device 110 perceives an image rather than just a single column of pixels at a time. That is, the processor 112 may be configured to iteratively cause different columns of pixels to display in the at least one visor portion such that a human wearing the head wearable display device 110 perceives a displayed image.

In some embodiments, each of the column injectors 124 may include or be implemented as digital mirror device (DMD) 124A, as shown in FIG. 5, a Pockels cell 124B, as shown in FIG. 6, or a ultrasonic refractive index modulator 124C, as shown in FIG. 7. FIGS. 5 through 7 depict exemplary means to divert the optical image signals, to be displayed, into the visor (e.g., 132) of the head wearable display device 110. For example, each DMD 124A may be include a flat or curved mirror element configured to deflect optical signals into the visor.

In some embodiments, each of the column injectors 124 may include collimating optics such that each of the column injectors is configured to receive optical signals and deflect collimated optical signals into the visor (e.g., 132). For example, each DMD 124A may include a curved mirror element configured to receive optical signals from the image illumination source 118 and to collimate the optical signals while deflecting collimated optical signals into the visor (e.g., 132).

While the head wearable display device 110 exemplarily includes elements as shown, in some embodiments, one or more of the elements of the head wearable display device 110 may be omitted, or the head wearable display device 110 may include other elements, such as shown in FIG. 11.

Figure 8:
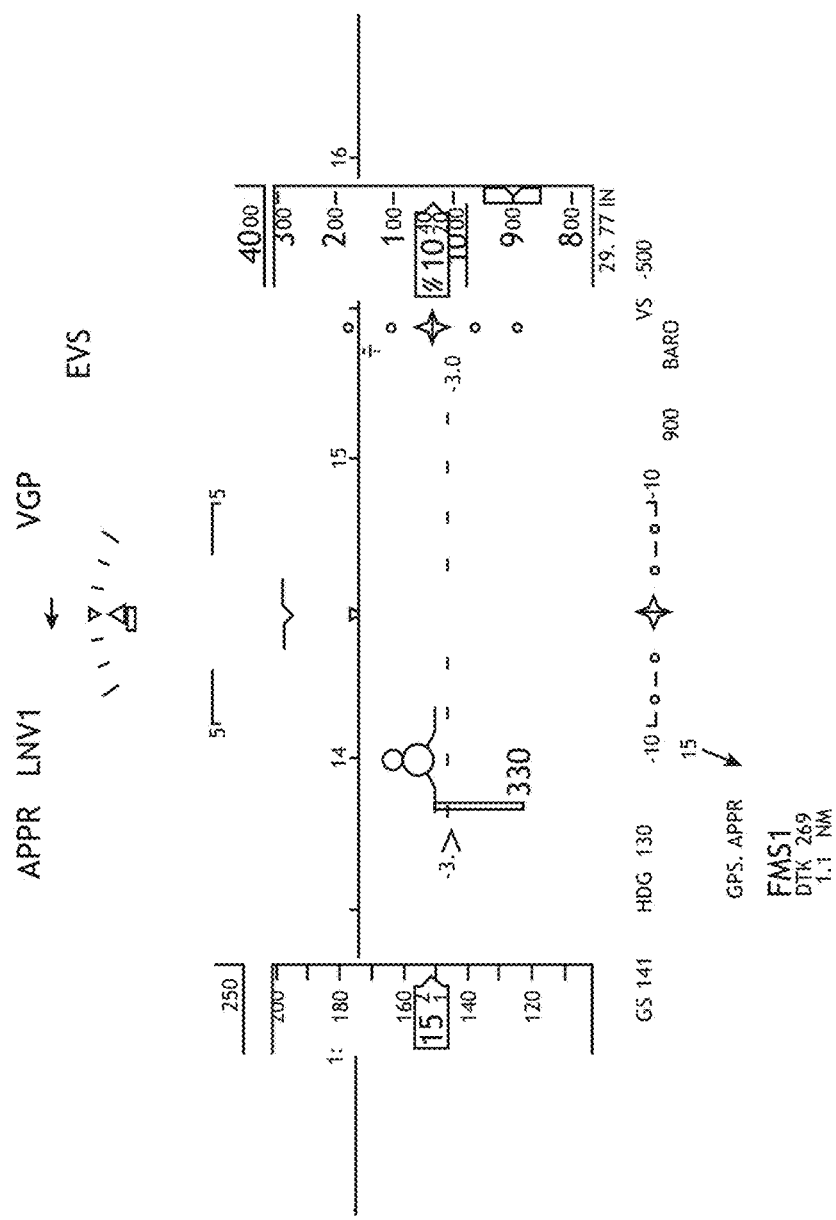
FIG. 8 is a view of an exemplary image to be displayed on the visor of head wearable display device of FIG. 1 according to the inventive concepts disclosed herein.

Referring now to FIG. 8, an exemplary image to be displayed on the visor (e.g., 132) of head wearable display device 110 is shown. The image may be any suitable image. For example, the image may be an FMS image, as shown in FIG. 8.

Figure 9:
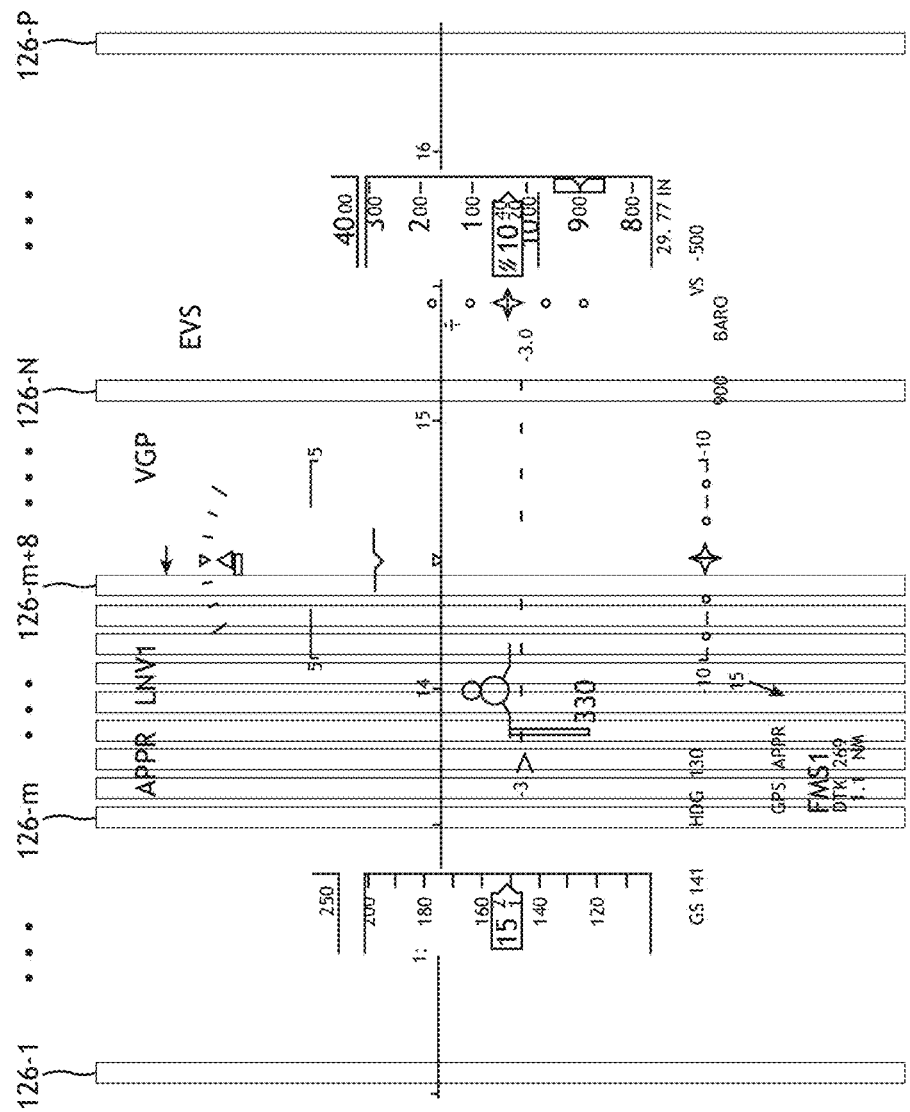
FIG. 9 is a representation of the image of FIG. 8 divided into columns of pixels according to the inventive concepts disclosed herein.

Referring now to FIG. 9, a representation of the image of FIG. 8 divided into columns 126-1 to 126-P is shown. Each of the columns 126-1-126-P (which includes columns 126-m, 126-m+8, and 126-N) of the image may be a column of pixels.

Figure 10:
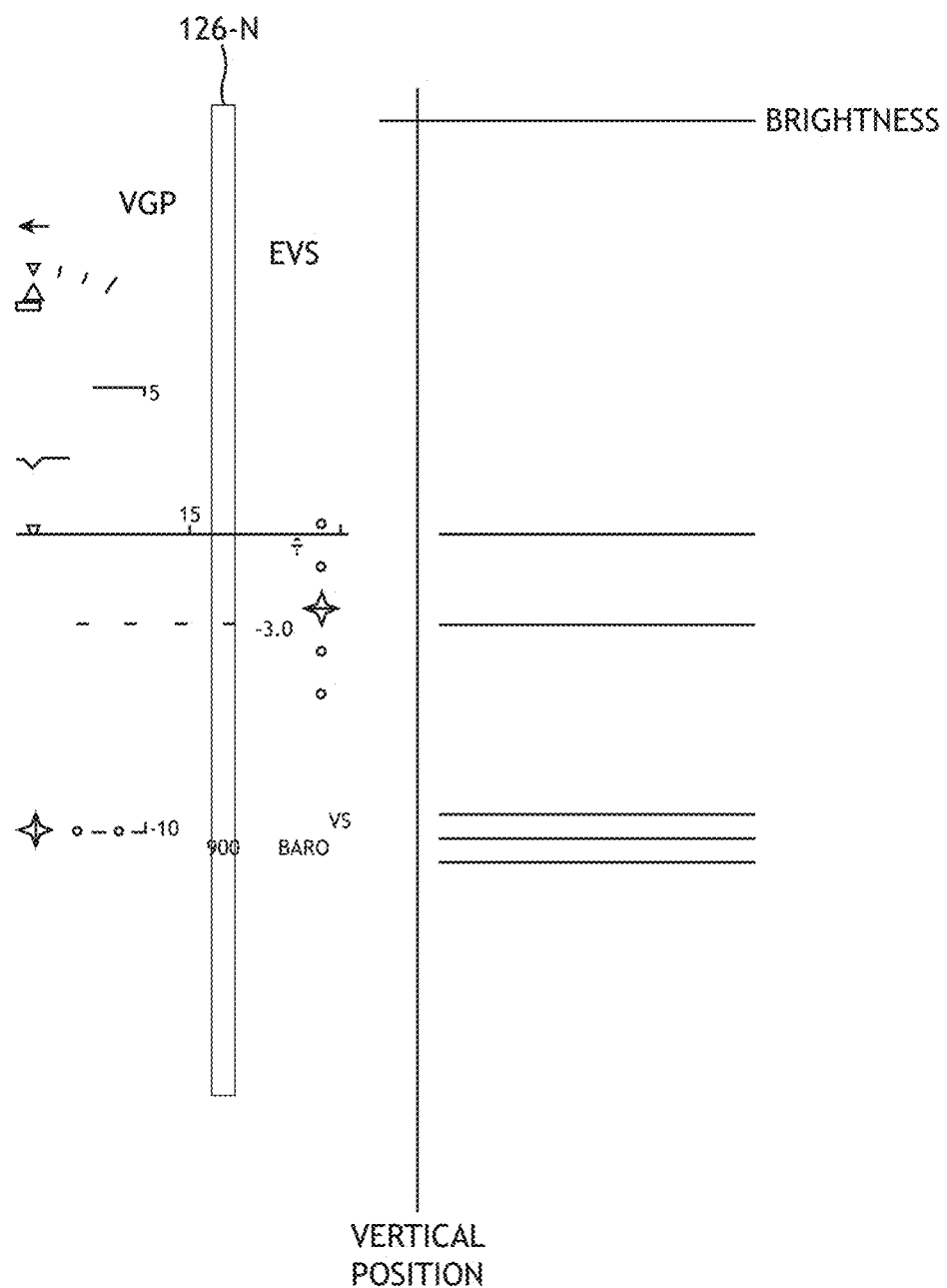
FIG. 10 is a representation of a column of the image of FIG. 9 shown alongside a brightness indicator representation according to the inventive concepts disclosed herein.

Referring now to FIG. 10, a representation of the column 126-N of the image of FIG. 9 is shown alongside a brightness indicator representation. The brightness indicator illustrates which pixels of a column of pixels are active. For example, with respect to the column 126-N, the processor 112 may be configured to collimate the image data corresponding to the column 126-N and generate collimated image illumination data corresponding to the column 126-N. Similarly, the image illumination source 118 may be configured to generate optical signals corresponding to the column 126-N. Additionally, the collimating optics 120 may be configured to collimate the optical signals corresponding to the column 126-N. Further, a particular column injector (e.g., 124-N, as shown in FIG. 11) in the deflect state may be configured to deflect the collimated optical signals into the at least one visor portion causing the column 126-N of pixels to display in the at least one visor portion. Similarly, each column (e.g., 126-1 to 126-P) of the image may be successively and iteratively displayed on the visor of the head wearable display device 110.

Referring now to FIG. 11, an exemplary view of the head wearable display device 110 of FIG. 1 is shown. In addition to the elements depicted in and described with respect to FIG. 1, the head wearable display device 110 may include a visor 132, an optical pathway 130, and side portions (e.g., temple bars 134).

The visor 132 may be implemented as a pupil-expanding waveguide (e.g., meaning that the visor 132 may diffract or reflect out part of the deflected collimated optical signals to a wearer as the deflected collimated optical signals travel from the column injectors 124 toward an edge (e.g., a bottom edge) of the visor 132, wherein the edge (e.g., a bottom edge) of the visor 132 is opposite the optical pathway 130). The visor 132, as shown, is a transparent, curved, and panoramic visor implemented as a single visor portion. In some embodiments the visor 132 may be implemented as a plurality of visor portions, such as a visor portion associated with each eye of a wearer. Additionally, in some embodiments, the visor may have any suitable shape (e.g., flat or curved). In some embodiments, the visor 132 may be implemented as partially transparent (e.g., tinted).

The side portions (e.g., the temple bars 134) may rigidly or hingedly attached to sides edges of the visor 132. The side portions (e.g., the temple bars 134) may be configured to support the head wearable display device 110 on a wearer's head. In some embodiments, the side portions may include some or all of the processor 112, the memory 114, the storage 116, the image illumination source 118, the collimating optics 120, and/or the optical injector 122.

Figure 12:
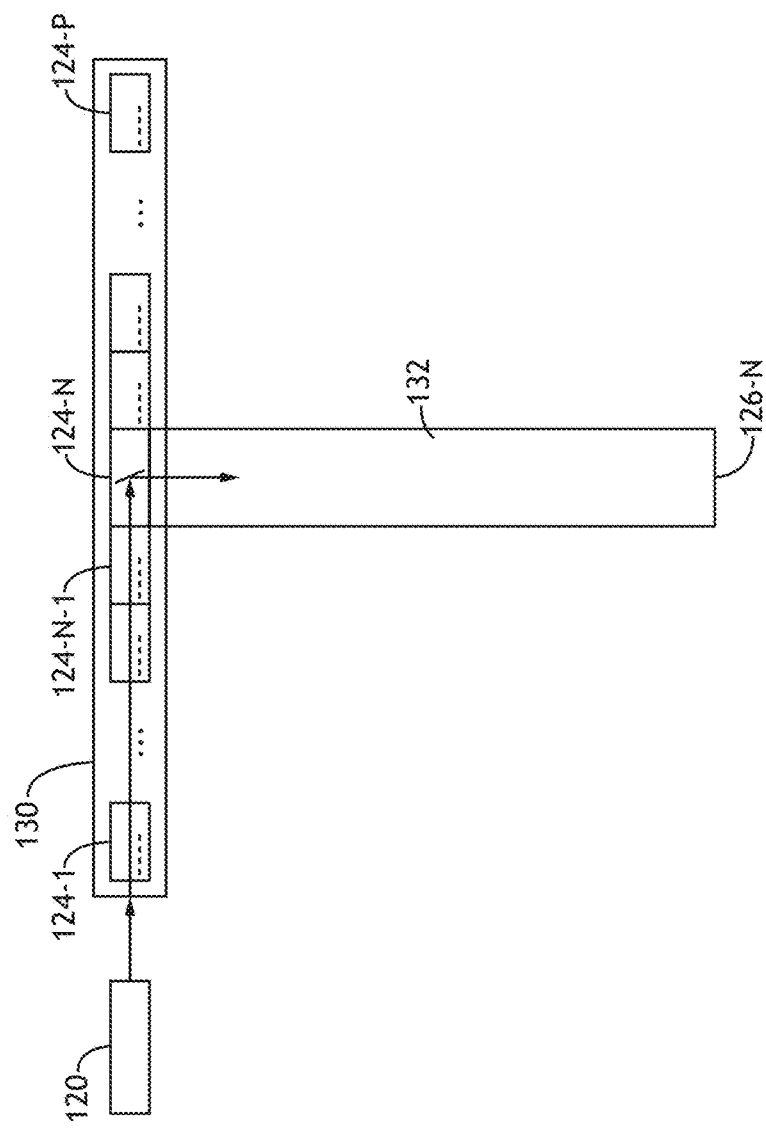
FIG. 12 is a view of portions of some elements of the head wearable display device of FIGS. 1 and 11 at a first given time according to the inventive concepts disclosed herein.

Referring now to FIG. 12, portions of some elements of the head wearable display device 110 of FIGS. 1 and 11 at a first given time are shown. The column injectors 124 are shown as column injectors 124-1 to 124-P. For example, at the first given time, the processor 112 may be configured to cause column injector 124-N of the column injectors 124 to be in a deflect state while causing intervening column injectors 124-1 through 124-N−1 positioned between the column injector 124-N and the collimating optics 120 to be in pass through states such that the collimated optical signals pass through the intervening column injectors 124-1 through 124-N−1 in the pass through states to the column injector 124-N in the deflect state and such that the collimated optical signals are deflected into the visor 132 by the column injector 124-N.

Figure 13:
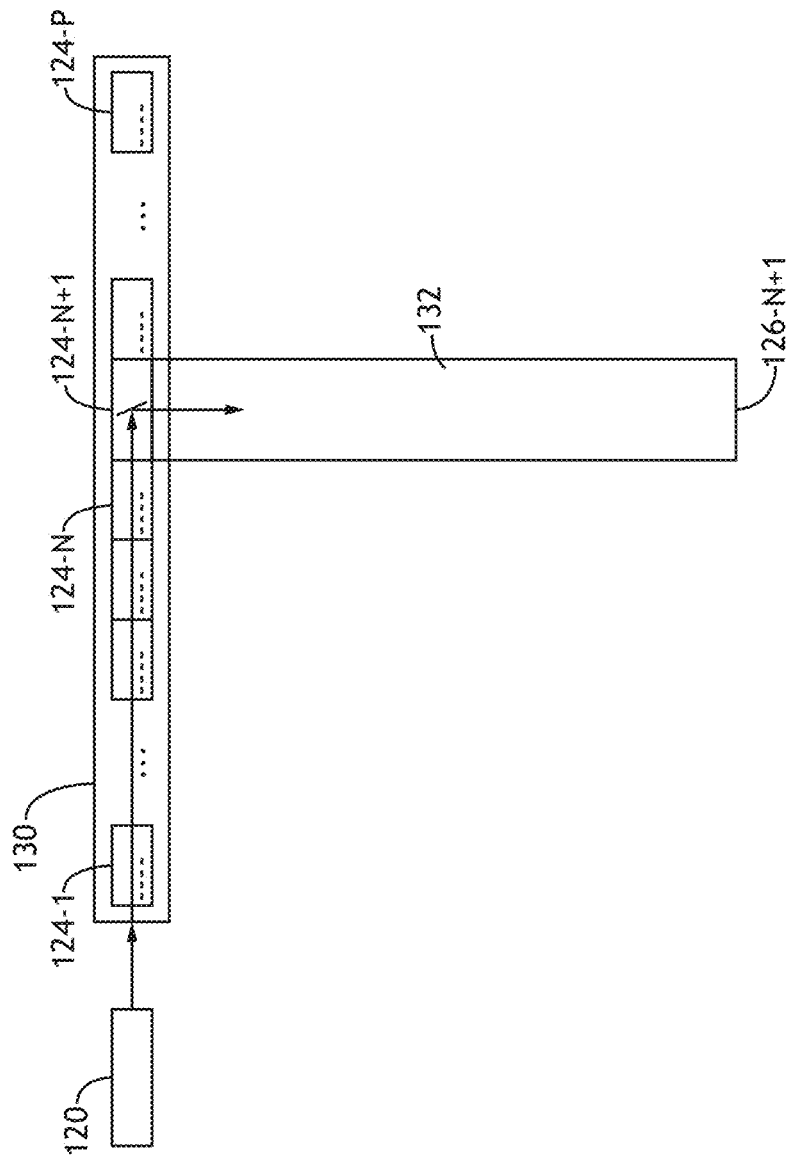
FIG. 13 is a view of portions of some elements of the head wearable display device of FIG. 12 at a second given time according to the inventive concepts disclosed herein.

Referring now to FIG. 13, portions of some elements of the head wearable display device 110 of FIG. 12 at a second given time are shown. For example, at the second given time, the processor 112 may be configured to cause column injector 124-N+1 of the column injectors 124 to be in a deflect state while causing intervening column injectors 124-1 through 124-N positioned between the column injector 124-N+1 and the collimating optics 120 to be in pass through states such that the collimated optical signals pass through the intervening column injectors 124-1 through 124-N in the pass through states to the column injector 124-N+1 in the deflect state and such that the collimated optical signals are deflected into the visor 132 by the column injector 124-N+1.

Figure 14:
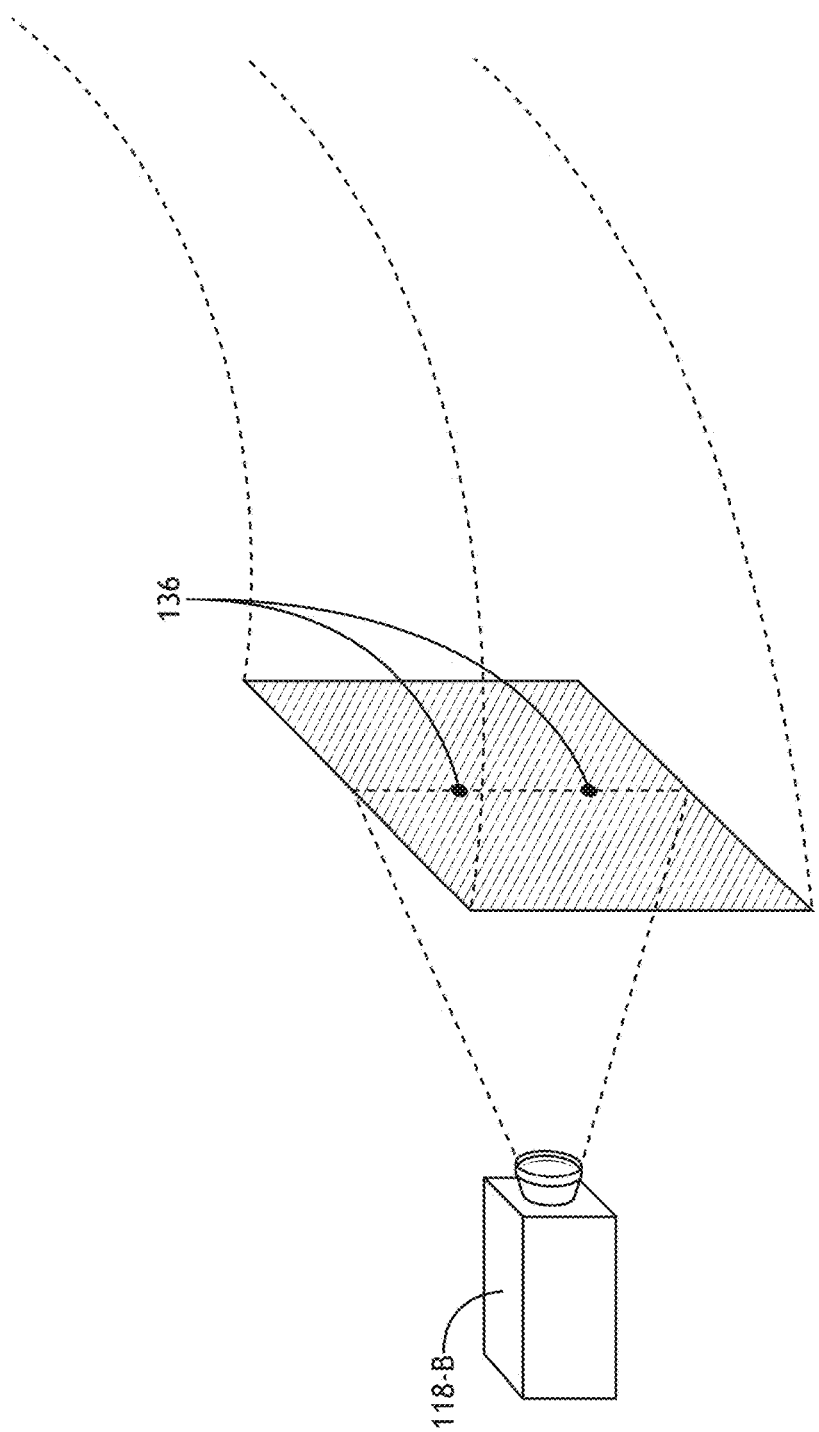
FIG. 14 is a view of the image illumination source of the head wearable display device of FIG. 1 implemented as or including a laser device of FIG. 3 according to the inventive concepts disclosed herein.

Referring now to FIG. 14, the image illumination source 118 implemented as or including the laser device 118B of FIG. 3 is shown. The laser device 118B may be configured to optically scan onto phosphorescent elements 136 of a phosphorescent layer so as to create the optical signals.

Figure 15:
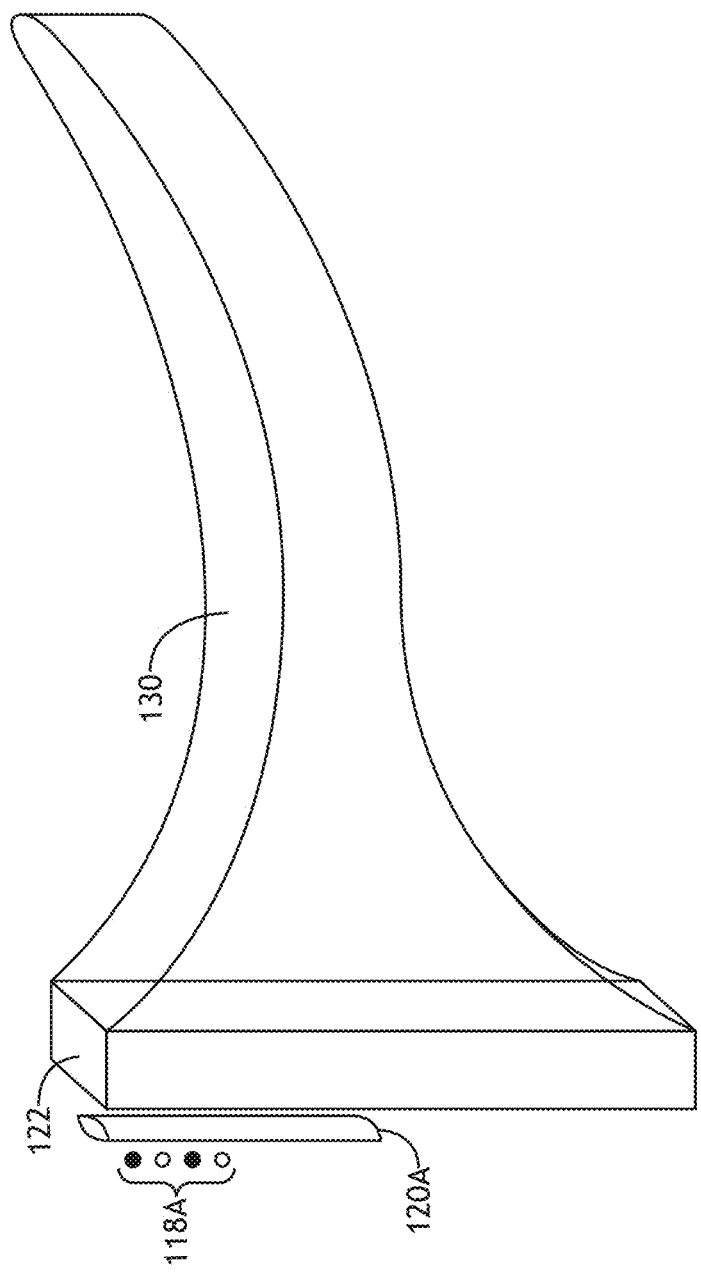
FIG. 15 is a view of the image illumination source of FIGS. 1 and 11 implemented as or including a column of LEDs of FIG. 2 and collimating optics of FIG. 1 implemented as or including the microlens array of FIG. 4 according to the inventive concepts disclosed herein.

Referring now to FIG. 15, the image illumination source 118 implemented as or including a column of LEDs 118A of FIG. 2 and collimating optics 120 implemented as or including the microlens array 120A of FIG. 4 are shown.

Figure 16:
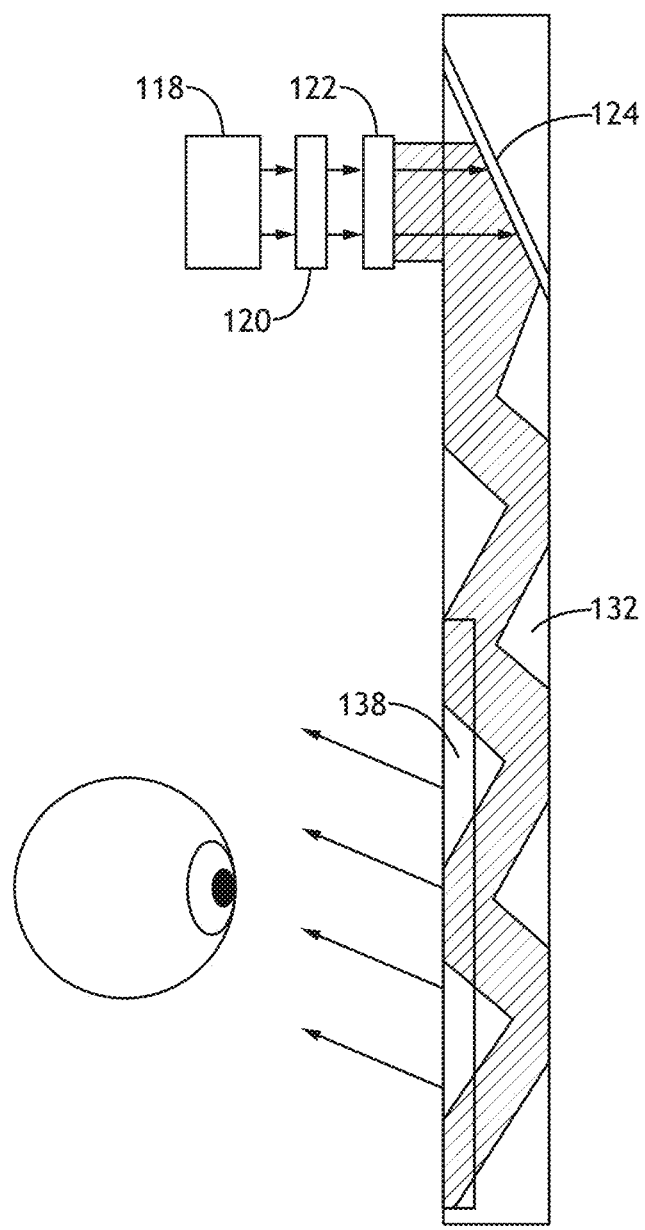
FIG. 16 is a view of an exemplary embodiment of the visor implemented as a pupil-expanding waveguide of the head wearable display device of FIGS. 1 and 11 according to the inventive concepts disclosed herein.
Figure 17:
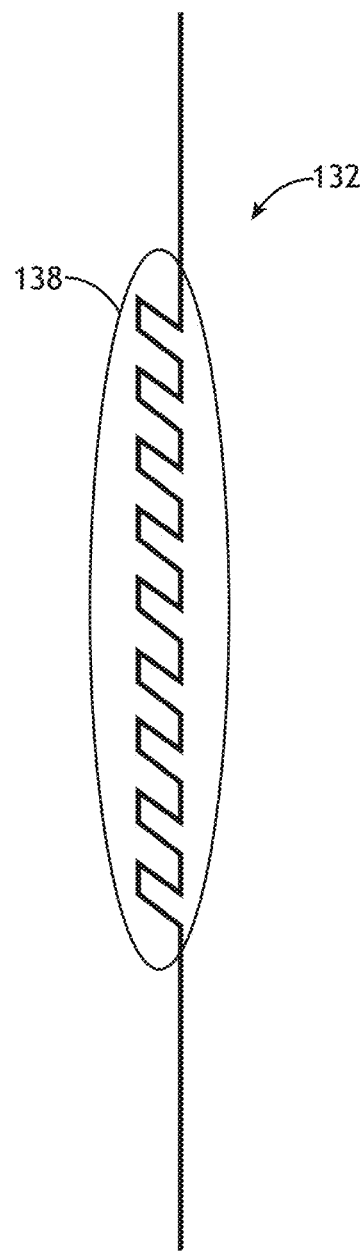
FIG. 17 is a view of the gratings of the visor of FIG. 16 according to the inventive concepts disclosed herein.

Referring now to FIGS. 16-17, the visor 132 implemented as a pupil-expanding waveguide of the head wearable display device 110 of FIGS. 1 and 11 is shown. The visor 132 implemented as a pupil-expanding waveguide may include diffraction gratings 138 (e.g., volume holograms, replicated gratings, and/or surface relief gratings) such that the visor 132 may diffract out part of the deflected collimated optical signals to a wearer as the deflected collimated optical signals travel from the column injectors 124 toward an edge (e.g., a bottom edge) of the visor 132, wherein the edge (e.g., a bottom edge) of the visor 132 is opposite the optical pathway 130.

Figure 18:
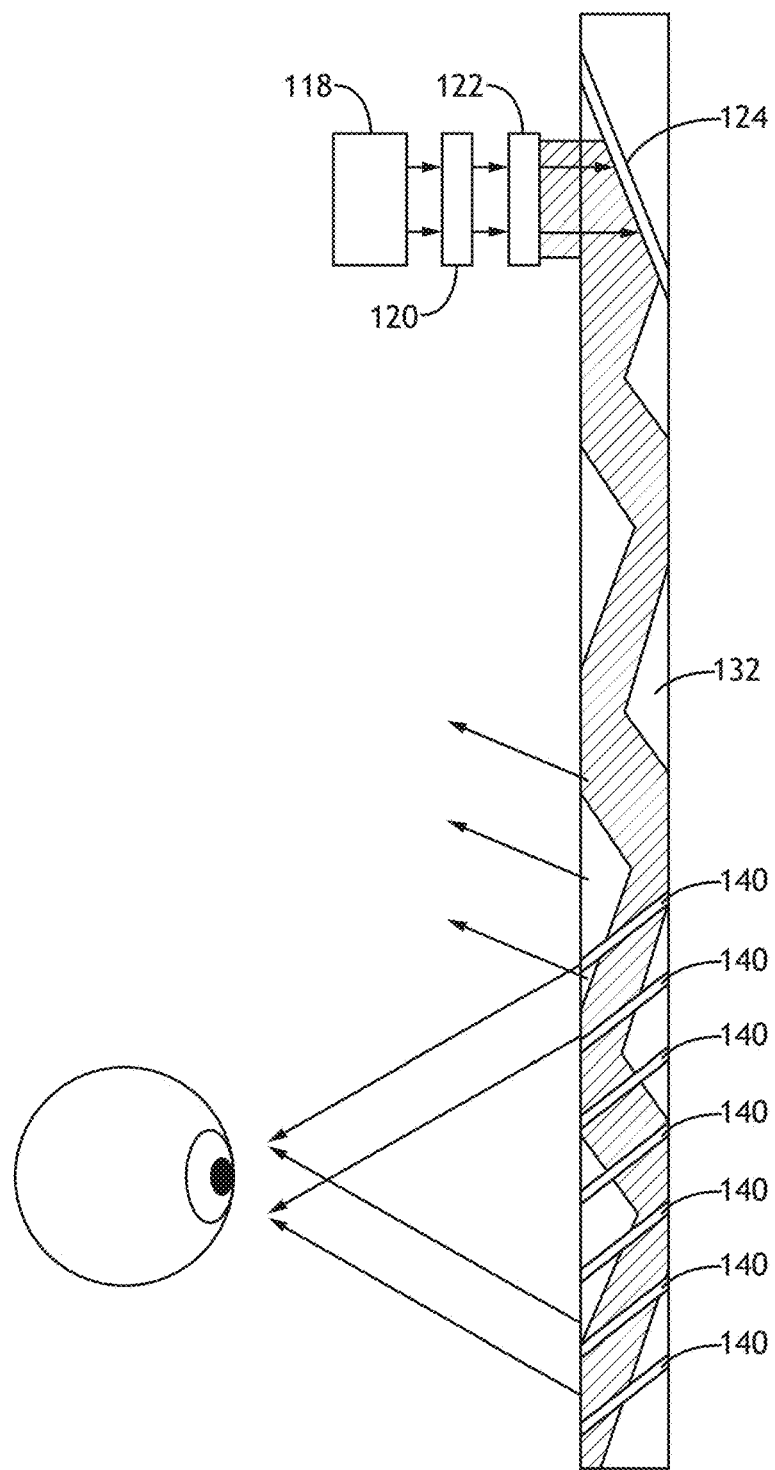
FIG. 18 is a view of a further exemplary embodiment of the visor implemented as a pupil-expanding waveguide of the head wearable display device of FIGS. 1 and 11 according to the inventive concepts disclosed herein.

Referring now to FIG. 18, the visor 132 implemented as a pupil-expanding waveguide of the head wearable display device 110 of FIGS. 1 and 11 is shown. The visor 132 implemented as a pupil-expanding waveguide may include stepped beam splitter mirrors 140 such that the visor 132 may reflect out part of the deflected collimated optical signals to a wearer as the deflected collimated optical signals travel from the column injectors 124 toward an edge (e.g., a bottom edge) of the visor 132, wherein the edge (e.g., a bottom edge) of the visor 132 is opposite the optical pathway 130.

Figure 19:
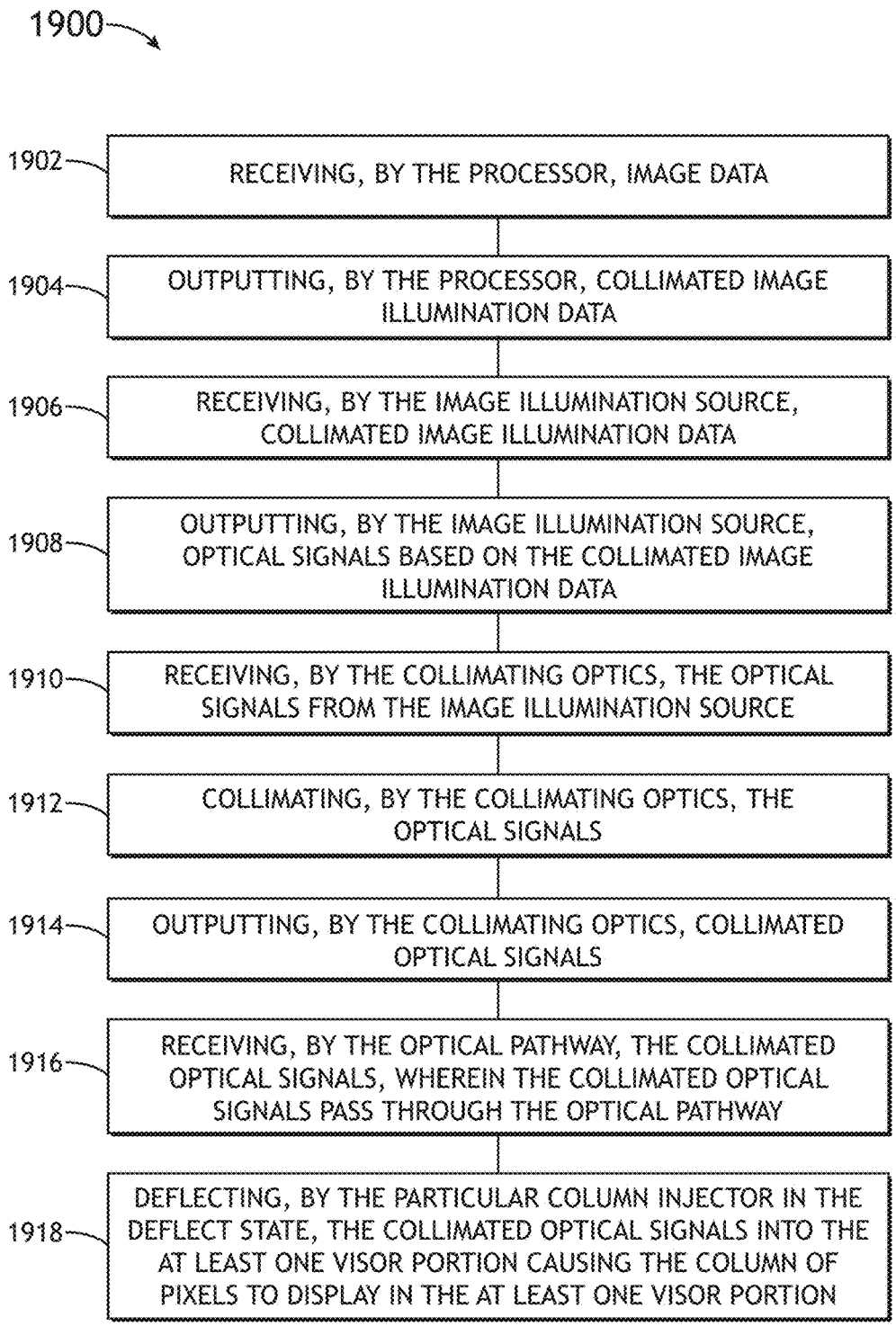
FIG. 19 is a diagram of an exemplary embodiment of a method for operating a head wearable display device according to the inventive concepts disclosed herein.

Referring now to FIG. 19, an exemplary embodiment of a method 1900 for operating a head wearable display device according to the inventive concepts disclosed herein may include one or more of the following steps. Additionally, for example, some embodiments may include performing one more instances of the method 1900 iteratively, concurrently, and/or sequentially. The head wearable display device may include at least one visor portion implemented as a pupil-expanding waveguide, a processor, an image illumination source, collimating optics, an optical pathway, and a plurality of column injectors, the image illumination source communicatively coupled to the processor, the collimating optics optically coupled to the image illumination source, the plurality of column injectors implemented in and along the optical pathway, each of the plurality of column injectors associated with a pixel column, each of the plurality of column injectors configured to be in a pass-through state or a deflect state, wherein when a given column injector is in the pass-through state, the given column injector allows the collimated optical signals to pass through the given column injector, wherein when a particular column injector is in the deflect state, the particular column injector is configured to deflect the collimated optical signals into the at least one visor portion causing a column of pixels to display in the at least one visor portion.

A step 1902 may include receiving, by the processor, image data.

A step 1904 may include outputting, by the processor, collimated image illumination data.

A step 1906 may include receiving, by the image illumination source, collimated image illumination data.

A step 1908 may include outputting, by the image illumination source, optical signals based on the collimated image illumination data.

A step 1910 may include receiving, by the collimating optics, the optical signals from the image illumination source.

A step 1912 may include collimating, by the collimating optics, the optical signals.

A step 1914 may include outputting, by the collimating optics, collimated optical signals.

A step 1916 may include receiving, by the optical pathway, the collimated optical signals, wherein the collimated optical signals pass through the optical pathway.

A step 1918 may include deflecting, by the particular column injector in the deflect state, the collimated optical signals into the at least one visor portion causing the column of pixels to display in the at least one visor portion.

Further, the method 1900 may include any of the operations disclosed throughout.

As will be appreciated from the above, embodiments of the inventive concepts disclosed herein may be directed to a method, a system, and a head wearable display device.

As used throughout and as would be appreciated by those skilled in the art, "at least one non-transitory computer-readable medium" may refer to as at least one non-transitory computer-readable medium (e.g., memory 106, memory 114, storage 108, storage 1116 or a combination thereof; e.g., at least one computer-readable medium implemented as hardware; e.g., at least one non-transitory processor-readable medium, at least one memory (e.g., at least one non-volatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, ..., one hundred, or more. Similarly, as used throughout, "one or more" means one or a plurality of; for example, "one or more" may comprise one, two, three, ..., one hundred, or more. Further, as used throughout, "zero or more" means zero, one, or a plurality of; for example, "zero or more" may comprise zero, one, two, three, ..., one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A head wearable display device, comprising:
   at least one visor portion implemented as a pupil-expanding waveguide;
   a processor configured to receive image data and output collimated image illumination data;
   an image illumination source communicatively coupled to the processor, the image illumination source configured to:
      receive the collimated image illumination data; and
      output optical signals based on the collimated image illumination data;
   an optical pathway configured to receive the optical signals, wherein the optical signals pass through the optical pathway; and
   a plurality of column injectors implemented in and along the optical pathway, each of the plurality of column injectors associated with a pixel column, each of the plurality of column injectors configured to be in a pass-through state or a deflect state, wherein when a given column injector is in the pass-through state the given column injector allows the optical signals to pass through the given column injector, wherein when a particular column injector is in the deflect state the particular column injector is configured to deflect the optical signals into the at least one visor portion causing a column of pixels to display in the at least one visor portion,
   wherein, at a given time, the processor is further configured to cause a first column injector of the plurality of column injectors to be in a deflect state while causing intervening column injectors positioned between the first column injector and the collimating optics to be in pass through states such that the optical signals pass through the intervening column injectors in the pass through states to the first column injector in the deflect state and such that the optical signals are deflected into the at least one visor portion by the first column injector.

2. The head wearable display device of claim 1, further comprising:
   collimating optics optically coupled to the image illumination source, the collimating optics configured to:
      receive the optical signals from the image illumination source;
      collimate the optical signals; and
      output the optical signals to the optical pathway as collimated optical signals.

3. The head wearable display device of claim 1, wherein, when the particular column injector is in the deflect state, the particular column injector is further configured to collimate the optical signals as the particular column injector deflects the optical signals into the at least one visor portion causing the column of pixels to display in the at least one visor portion.

4. The head wearable display device of claim 1, wherein the processor is further configured to cause each of the plurality of column injectors to be in a pass-through state or a deflect state.

5. The head wearable display device of claim 1, wherein, at a second given time, the processor is further configured to cause a second column injector of the plurality of column injectors to be in a deflect state while causing second intervening column injectors positioned between the second column injector and the collimating optics to be in pass through states such that the optical signals pass through the second intervening column injectors in the pass through states to the second column injector in the deflect state and such that the optical signals are deflected into the at least one visor portion by the second column injector.

6. The head wearable display device of claim 1, wherein the head wearable display device is configured to iteratively cause different columns of pixels to display in the at least one visor portion such that a human wearing the head wearable display device perceives a displayed image.

7. The head wearable display device of claim 1, wherein the image illumination source comprises light emitting diode (LED) elements.

8. The head wearable display device of claim 1, wherein the image illumination source comprises a laser device.

9. The head wearable display device of claim 1, wherein the collimating optics comprises a microlens array.

10. The head wearable display device of claim 1, wherein each of the plurality of column injectors comprises a digital mirror device (DMD).

11. The head wearable display device of claim 1, wherein the at least one visor portion includes diffraction gratings.

12. The head wearable display device of claim 1, wherein the at least one visor portion includes stepped beam splitter mirrors.

13. The head wearable display device of claim 1, wherein the at least one visor portion is at least partially transparent.

14. The head wearable display device of claim 1, wherein the at least one visor portion is implemented as a panoramic visor.

15. The head wearable display device of claim 1, wherein the optical pathway is implemented along a top or bottom portion of the at least one visor portion.

16. The head wearable display device of claim 1, wherein the head wearable display device does not obscure a brow area visual field of view of a wearer of the head wearable display device.

17. The head wearable display device of claim 1, wherein the head wearable display device is a helmet.

18. A system, comprising:
   a computing device comprising at least one processor and memory, the computing device configured to output image data; and
   a head wearable display device communicatively coupled to the computing device, the head wearable display device comprising:
      at least one visor portion implemented as a pupil-expanding waveguide;
      a processor configured to receive the image data and output collimated image illumination data;
      an image illumination source communicatively coupled to the processor, the image illumination source configured to:
         receive the collimated image illumination data; and
         output optical signals based on the collimated image illumination data;
      an optical pathway configured to receive the optical signals, wherein the optical signals pass through the optical pathway; and
      a plurality of column injectors implemented in and along the optical pathway, each of the plurality of column injectors associated with a pixel column, each of the plurality of column injectors configured to be in a pass-through state or a deflect state, wherein when a given column injector is in the pass-through state the given column injector allows the optical signals to pass through the given column injector, wherein when a particular column injector is in the deflect state the particular column injector is configured to deflect the optical signals into the at least one visor portion causing a column of pixels to display in the at least one visor portion,
      wherein, at a given time, the processor is further configured to cause a first column injector of the plurality of column injectors to be in a deflect state while causing intervening column injectors positioned between the first column injector and the collimating optics to be in pass through states such that the optical signals pass through the intervening column injectors in the pass through states to the first column injector in the deflect state and such that the optical signals are deflected into the at least one visor portion by the first column injector.

19. A method for operating a head wearable display device including at least one visor portion implemented as a pupil-expanding waveguide, a processor, an image illumination source, an optical pathway, and a plurality of column injectors, the image illumination source communicatively coupled to the processor, the plurality of column injectors implemented in and along the optical pathway, each of the plurality of column injectors associated with a pixel column, each of the plurality of column injectors configured to be in a pass-through state or a deflect state, wherein when a given column injector is in the pass-through state the given column injector allows optical signals to pass through the given column injector, wherein when a particular column injector is in the deflect state the particular column injector is configured to deflect the optical signals into the at least one visor portion causing a column of pixels to display in the at least one visor portion, the method comprising:
   receiving, by the processor, image data;
   outputting, by the processor, collimated image illumination data;
   receiving, by the image illumination source, the collimated image illumination data;
   outputting, by the image illumination source, the optical signals based on the collimated image illumination data;
   receiving, by the optical pathway, the optical signals, wherein the optical signals pass through the optical pathway; and
   deflecting, by the particular column injector in the deflect state, the optical signals into the at least one visor portion causing the column of pixels to display in the at least one visor portion,
   wherein, at a given time, the processor is configured to cause a first column injector of the plurality of column injectors to be in a deflect state while causing intervening column injectors positioned between the first column injector and the collimating optics to be in pass through states such that the optical signals pass through the intervening column injectors in the pass through states to the first column injector in the deflect state and such that the optical signals are deflected into the at least one visor portion by the first column injector.

* * * * *